US012746417B2

(12) United States Patent
Chin et al.

(10) Patent No.: US 12,746,417 B2
(45) Date of Patent: Sep. 29, 2026

(54) HYDROGEN FUSIBLE LINK

(71) Applicant: ATOMIC ENERGY OF CANADA LIMITED/ÉNERGIE ATOMIQUE DU CANADA LIMITÉE, Chalk River (CA)

(72) Inventors: Yu-Shan Chin, Deep River (CA); Anthony Clouthier, Arnprior (CA); Zhe Liang, Deep River (CA); Lee Gardner, Pembroke (CA); Joshua Murphy, Deep River (CA)

(73) Assignee: ATOMIC ENERGY OF CANADA LIMITED/ÉNERGIE ATOMIQUE DU CANADA LIMITÉE, Chalk River (CA)

(*) Notice: Subject to any disclaimer, the term of this patent is extended or adjusted under 35 U.S.C. 154(b) by 371 days.

(21) Appl. No.: 18/266,852

(22) PCT Filed: Dec. 14, 2021

(86) PCT No.: PCT/CA2021/051810
§ 371 (c)(1),
(2) Date: Jun. 13, 2023

(87) PCT Pub. No.: WO2022/126264
PCT Pub. Date: Jun. 23, 2022

(65) Prior Publication Data

US 2024/0050787 A1 Feb. 15, 2024

Related U.S. Application Data

(60) Provisional application No. 63/125,662, filed on Dec. 15, 2020.

(51) Int. Cl.
*A62C 2/24* (2006.01)
*A62C 2/14* (2006.01)
(Continued)

(52) U.S. Cl.
CPC ................ *A62C 2/242* (2013.01); *A62C 2/14* (2013.01); *B01J 23/42* (2013.01); *B01J 23/44* (2013.01)

(58) Field of Classification Search
CPC ......... A62C 2/242; A62C 2/243; A62C 37/12; B01J 23/42; B01J 23/44; G01N 21/61
(Continued)

(56) References Cited

U.S. PATENT DOCUMENTS 324,316 A 8/1885 Hall
1,248,433 A * 11/1917 Lewis .................... A62C 37/12 169/42
(Continued)

FOREIGN PATENT DOCUMENTS

CA 2042080 A1 12/1991
CN 1250215 A * 4/2000
(Continued)

OTHER PUBLICATIONS

ISR/WO for PCT/CA2021/051810 mailed Feb. 22, 2022.
(Continued)

*Primary Examiner* — Michael G Hoang
*Assistant Examiner* — Frances F. Hamilton
(74) *Attorney, Agent, or Firm* — Joseph C. Zucchero; Carolyn S. Elmore; Elmore Patent Law Group, P.C.

(57) ABSTRACT

A hydrogen fusible link may include a first link member having a thermally conductive material, and reaction region and a bonding region. A bonding material may be in a solid state at an operating temperature and may have a melting temperature that is greater than the operating temperature. A catalyst material may coat the reaction region and may facilitate an exothermic chemical reaction when exposed to gaseous hydrogen to produce heat, wherein heat produced by the catalyst material is conducted to the bonding region
(Continued)

via the body to heat up the bonding material. When the catalyst material is exposed to a concentration of gaseous hydrogen that is at or above an activation concentration the reaction region produces sufficient heat to raise at least some of the bonding material above the melting temperature thereby failing at least some of the bonding material.

21 Claims, 9 Drawing Sheets

(51) Int. Cl.
*B01J 23/42* (2006.01)
*B01J 23/44* (2006.01)

(58) Field of Classification Search
USPC .......................................... 219/517; 454/369
See application file for complete search history.

(56) References Cited

U.S. PATENT DOCUMENTS

| | | | | | |
|---|---|---|---|---|---|
| 2,380,495 | A | * | 7/1945 | Banks | B01J 8/0285<br>337/402 |
| 2,384,501 | A | * | 9/1945 | Streicher | B01J 23/40<br>502/301 |
| 3,779,004 | A | | 12/1973 | Gloeckler | |
| 4,297,821 | A | * | 11/1981 | Peters | E04B 1/94<br>52/317 |
| 4,905,344 | A | | 3/1990 | Mccabe | |
| 5,120,152 | A | | 6/1992 | Gueli | |
| 5,157,005 | A | * | 10/1992 | Suppiah | B01J 29/068<br>502/62 |
| 5,686,878 | A | * | 11/1997 | Gueli | A62C 2/242<br>337/411 |
| 6,404,322 | B1 | | 6/2002 | Ruegsegger et al. | |
| 6,524,534 | B1 | * | 2/2003 | Tahara | G21C 9/06<br>422/177 |
| 2017/0373330 | A1 | * | 12/2017 | Tichy | H01M 8/0662 |

FOREIGN PATENT DOCUMENTS

| | | | | | |
|---|---|---|---|---|---|
| CN | 119018508 | A | * | 11/2024 | B65D 90/50 |
| FR | 3001789 | A1 | * | 8/2014 | F17C 13/12 |
| KR | 20170071976 | A | * | 6/2017 | E04B 1/942 |
| KR | 102745403 | B1 | * | 12/2024 | A62C 3/16 |

OTHER PUBLICATIONS

Barley, C. D, et al., "Analysis of Buoyancy-Driven Ventilation of Hydrogen from Buildings", National Renewable Energy Laboratory, NREL/CP-550-41081, Aug. 2007.

Hubert, T. , et al., "Trends in Gas Sensor Development for Hydrogen Safety. In Conference Proceedings", International Conference on Hydrogen Safety, Brussels, Belgium, Sep. 9-11, 2013.

Liang, Z. , et al., "Experimental Study on Accumulation of Helium Released into a Semiconfined Enclosure Without Ventilation", ICHS 2019: 8th International Conference on Hydrogen Safety, Adelaide, Australia, Sep. 24-26, 2019.

* cited by examiner

HYDROGEN FUSIBLE LINK

CROSS-REFERENCE TO RELATED APPLICATION

This application claims the benefit of U.S. provisional application No. 63/125,662, filed Dec. 15, 2020 and entitled Hydrogen Fusible Link. The entirety of this application being incorporated herein by reference.

FIELD

In one of its aspects, the present disclosure relates generally to a fusible link apparatus that can be activated when exposed to an activation concentration of hydrogen and systems that can incorporate such a fusible link.

INTRODUCTION

U.S. Pat. No. 324,316 discloses an improved securing-link for that class of automatic fire-extinguishers which are held inoperative by means of a lever by which the valve is pressed to its seat, said lever being secured by means of a link which is of ample strength to resist the force exerted upon the lever until the rising heat reaches the danger-point, when the weakening effect of the heat upon the link causes it to give way, and thereby liberate the valve, and allow the consequent escape of the water that the valve held in check; and the invention consists in a link formed of two U-shaped sections of brass or other suitable metal telescoped together, and united, as by soldering, with a metal of the desired susceptibility to heat, to be thereby sufficiently weakened when it reaches the danger-point to cause the solder to give way under the usual strain and allow the extinguisher to open and become operative, as above stated.

U.S. Pat. No. 3,779,004 discloses a fusible link that is suitable for use for controlling a weight release, for a door closer or for a sprinkler, which can be used in tension or compression, and which includes two link elements one inter-engaged with the other and held against movement by a transverse fusible temperature responsive retainer.

SUMMARY

Other aspects and features of the teachings disclosed herein will become apparent, to those ordinarily skilled in the art, upon review of the following description of the specific examples of the present disclosure. In accordance with one broad aspects of the teachings described herein a hydrogen fusible link may include a first link member having a body having a thermally conductive material and defining an outer surface. The outer surface may have a reaction region and a bonding region. A bonding material may be applied to the bonding region and may be configured to be in a solid state at an operating temperature to bond the first link member to another object positioned adjacent the bonding region. The bonding material may have a melting temperature that is greater than the operating temperature. A catalyst material may coat the reaction region. The catalyst material may be configured to facilitate an exothermic chemical reaction when exposed to gaseous hydrogen to produce heat. Heat produced by the catalyst material may be conducted to the bonding region via the body to heat up the bonding material. The first link member may be configured so that when the catalyst material is exposed to a concentration of gaseous hydrogen that is at or above an activation concentration the reaction region produces sufficient heat to raise at least some of the bonding material above the melting temperature thereby failing at least some of the bonding material.

The activation concentration of hydrogen may be less than about 4 volume percent.

The activation concentration of hydrogen may be less than about 2 volume percent.

The body portion may have a thermal conductivity of at least 10 watts per meter-kelvin (W/(m·K)

The body portion may have a thermal conductivity between 10 watts per meter-kelvin (W/(m·K) and about 400 (W/(m·K).

The first body link may include brass.

The catalyst may include at least one of a platinum catalyst and a palladium catalyst.

The first link may also include a mechanical attachment portion for attaching to another structure.

The link may also include a second link having a body including a thermally conductive material and defining an outer surface. The outer surface may have a second reaction region and a second bonding region that is opposite and bonded to the bonding region of the first link member via the bonding material.

The second link may have a second mechanical attachment portion for attaching to another structure.

In accordance with another broad aspect of the teachings described herein, a passive, hydrogen-triggered ventilation system may include a damper having at least one blade that is moveable between an open position in which air can flow through the damper and a closed position in which airflow through the damper is inhibited. The at least one blade may be biased toward the open position. A hydrogen fusible link may retain the at least one blade in the closed position. The hydrogen fusible link may include a first link member having a body having a thermally conductive material and defining an outer surface. The outer surface may have a reaction region and a bonding region. A bonding material may be applied to the bonding region and may be configured to be in a solid state at an operating temperature to connect the first link member to the at least one blade. The bonding material may have a melting temperature that is greater than the operating temperature; and

- a catalyst material coating the reaction region, the catalyst material configured to facilitate an exothermal chemical reaction when exposed to gaseous oxygen and gaseous hydrogen to produce heat, wherein heat produced by the catalyst material is conducted to the bonding region via the body to heat up the bonding material;
- and wherein first link member is configured so that when the catalyst material is exposed to a concentration of gaseous hydrogen that is at or above an activation concentration the reaction region produces sufficient heat to raise at least some of the bonding material above the melting temperature thereby melting at least some of the bonding material thereby disconnecting the first link member from the at least one blade and allowing the at least one blade to move to the open position.

The bonding region of the first link may be directly connected to the at least one blade.

The system may include a second link having a body having a thermally conductive material and defining an outer surface. The outer surface may have a second reaction region and a second bonding region that is opposite and bonded to the bonding region of the first link member via the bonding material. The second link may extend between and connect the first link to the at least one blade.

The activation concentration may be less than about 4 volume percent.

The body portion may have a thermal conductivity of at least 10 watts per meter-kelvin (W/(m·K).

The first body link may include brass.

The catalyst may include at least one of a platinum catalyst and a palladium catalyst.

The catalyst comprises a Type 99-11 catalyst formulation material.

The catalyst material may be configured so that the reaction region produces sufficient heat to raise at least some of the bonding material to a temperature that is greater than 70 degrees Celsius, and preferably is greater than 80, 90, 100, 110, 120 higher degrees Celsius when exposed to a hydrogen concentration that is equal to or less than 2% vol.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Figure 1:
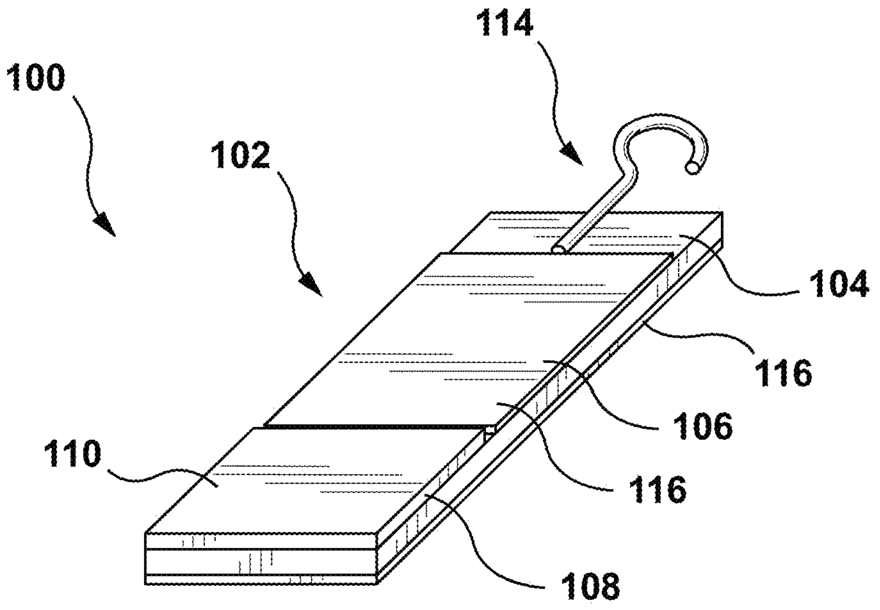
FIG. 1 is a perspective view of one example of a hydrogen fusible link.

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

The hydrogen economy has been proposed as a successor to the current use of hydrocarbon as an energy carrier, for example to help reduce the negative environmental impact of using hydrocarbon fuels. This may include the relatively wider adoption of hydrogen energy based vehicles and power generators, and other hardware that contains, produces and/or consumes hydrogen when in normal operation. As such, it is expected that hydrogen gas may be present in more locations and in more devices in the future than it is presently.

Hydrogen has relatively wide explosive/ignition mixture ranges with air and can pose a safety risk if concentrations of hydrogen accumulate in enclosed spaces, buildings, garages, or any other such locations. Therefore, hydrogen safety and mitigation need to be considered to help support the successful public acceptance of hydrogen as an energy carrier.

One example of an issue to be addressed in terms of safety is the use of hydrogen-power and/or hydrogen-containing systems in confined or semi-confined areas, such as garages, underground parking, and long tunnels, due to potential for accumulation of flammable hydrogen gas mixtures. However, if hydrogen were to be accidentally released into such any environment or enclosure, its hazard may be at least partially mitigated by ventilation of the area. For example, it may be desirable to keep the hydrogen concentration well below its flammability limit (e.g. the lower flammability limit of hydrogen is approximately 4% hydrogen by volume in air at atmospheric pressure and temperature). If hydrogen is being released from a source (e.g., a leak from a hydrogen-containing system) its concentration may not be uniform within the area, as it may have a relatively higher concentration close to the release point (optionally up to about 100% at the release point) and the concentration may generally decrease farther away from release point. In some systems, an objective for a ventilation system may be to help prevent accumulation of relatively large volumes/concentrations of hydrogen above the flammability limit.

One option to help control the hydrogen concentration within a confined region is to consume the hydrogen using a suitable apparatus, such as a Passive Autocatalytic Recombiners (PAR) designed by Atomic Energy of Canada Limited. However, such units may be relatively expensive and may not be suitable for all circumstances. Also, consuming or otherwise rendering inert the hydrogen may not be required in all instances, as ventilating the space and/or exhausting excess hydrogen from within an enclosed environment to the general, surrounding atmosphere may be adequate for reducing the local hydrogen concentration. For example, the Canadian Hydrogen Installation Code (CAN/BNQ 1784-000) addresses hydrogen accumulation by requiring all indoor hydrogen installations to be adequately vented to the outdoors with a minimum ventilation rate of 6 air changes per hour or 0.3 $m^3$/min per square metre of floor space. Depending on the circumstances other regulations and codes may apply.

Maintaining such relatively high ventilation rates may be impractical and may be relatively expensive for interior storage, production or use of hydrogen, especially in climates where environmental temperatures deviate significantly from normal indoor room temperatures. Active ventilation systems may also consume electrical power while in use. One option to help reduce power consumption and/or air temperature and heating loads may be to activate a suitable ventilation system only when a hydrogen leak occurs, or when a concentration of hydrogen within an area reaches or passes a pre-determined activation threshold (which is preferably less than the flammability limit). One way to control a system of this nature would be via the use of a commercial active hydrogen detector that will detect the presence of hydrogen and then activate an active or passive ventilation system.

However, active systems would require a power source, and battery backup systems which may not be available and/or reliable (such as during a power outage, and especially in non-industrial backup power systems). Additional safety measures (e.g. isolation) would be needed to eliminate the electrical power as a potential ignition source for hydrogen. Instead, there remains a need for a passive hydrogen ventilation system that can be triggered when hydrogen reaches a pre-determined threshold to help deal with hydrogen accumulation within a given area (such as leaks of an indoor hydrogen storage system and/or hydrogen powered vehicle within a garage) without requiring electrical power, battery back-up or other electronics or controllers to activate the system. This may help reduce power consumption and/or may help ensure that the ventilation system can remain operational in instances of power failure or the like. This may also be useful when considering systems to be used in remote locations in which reliable electrical power is not available, is relatively costly or is limited in its availability. Passive systems of this nature may also be useful in non-commercial and/or residential applications in which home owners may be hesitant to invest in powered, active ventilation systems and/or in which the system is to be retrofit into a structure that cannot easily accommodate a powered, active system.

Some known commercial hydrogen detectors are also generally based on a catalyst reaction concept; however, such detectors tend to correlate the hydrogen concentration with a measured temperature rise or adsorption of hydrogen molecules using powered electronics and other instrumentation. These detectors do not use the heat from a catalyst reaction to actually cause a mechanical change in the apparatus and require electronics and electrical power to operate in their intended manner.

One way to trigger or activate such a passive hydrogen ventilation system may be to use a mechanical trigger mechanism that is reactive to, and can be activated by the presence of hydrogen in the air above a pre-determined threshold. One example of such a mechanism is described herein as a hydrogen fusible link (HFL). An HFL may preferably be configured so that it can remain in an initial, inactive state when exposed to standard air (and other environments in which the hydrogen concentration is below the pre-determined activation threshold) and when exposed to a range of expected and suitable operating temperatures. When exposed to an elevated concentration of hydrogen, the HFL can preferably be activated and can change its mechanical configuration such that it can then influence the actions and/or movements of other components in the ventilation system and that this can be done without requiring electrical power.

Some known examples of other types of fusible links have been used in fire or heat-activate systems such as to help close fire dampers in the event of a fire. Such fusible links generally consists of two pieces of metal that are joined together by solder to form a single link with mechanical connection points at each end. The solder can be selected to melt at a desired activation temperature (for example, a fusible link for fire dampers will open at 165° F. or 73.9° C.). When exposed to a fire, the link will heat up and melt the solder allowing the link to separate, which can then release a mechanism that closes the fire dampers or causes other actions.

Heat or fire-activated fusible links of this nature are reactive and may be triggered after a fire or extreme temperature event has occurred. In contrast, it may be preferable in some circumstances for a passive system to be triggered before a fire or explosion occurs. Advantageously, it has been discovered that a HFL can be configured to generate its own heat when exposed to a pre-determined threshold concentration of hydrogen without requiring that the hydrogen have reached its flammability limit, caught fire, exploded or otherwise require the surrounding environmental temperature to reach an activation threshold or limit.

HFL's of this design may utilize an exothermic reaction, facilitated by a suitable catalyst material, in the presence of gaseous hydrogen facilitated to produce heat. In some cases, HFL's may utilize an exothermic reaction between hydrogen and oxygen facilitated by a suitable catalyst material to produce the necessary heat. In this case, when a catalyst-coated HFL is exposed to a hydrogen-air mixture, an exothermic reaction may occur on the catalyst surface that will produce sufficient thermal energy to heat up the HFL itself to a temperature that is sufficient to melt a bonding compound and/or other component of the HFL or surrounding structure. This self-heating and melting of the bonding compound may then activate the HFL and it may be configured such that its activation may facilitate the opening of corresponding ventilation dampers to allow the hydrogen-air mixture to be passively vented from the area or start an active ventilation system to purge the area.

Alternatively, or in addition, a system may be configured to include an HFL in an emergency stop interlock in which the triggering of the HFL can turn off or otherwise interrupt the operation of an active ventilation system which may be useful to help reduce the drawing of combustible hydrogen gases into an active heating, ventilation and air condition (HVAC) system. For example, an HFL of this nature may be utilized as a mechanical fuse to interrupt the operation of an HVAC system if the hydrogen concentration in a given area reaches the activation/trigger threshold value to help prevent hydrogen in one area from being moved to other areas. The bonding compound in the HFL's may be any suitable material, and may include solder materials, brazing materials, joining compounds that include metals with relatively lower melting temperatures like lead or the like as described herein.

Figure 2:
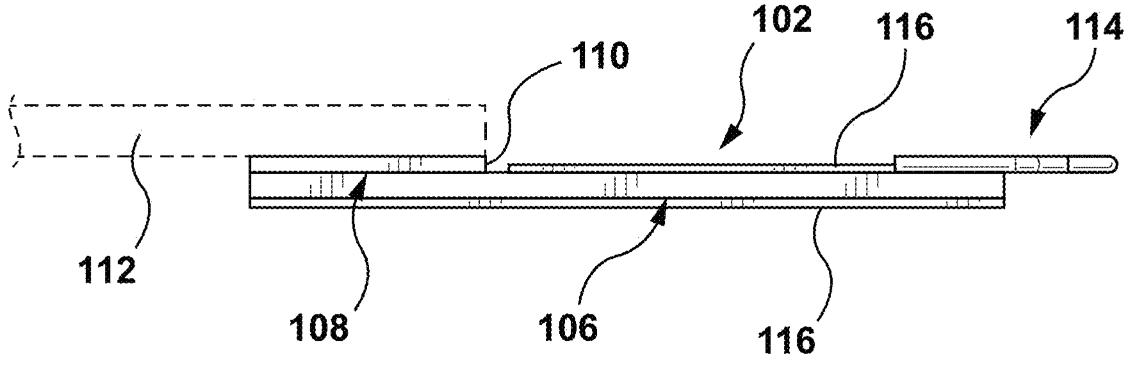
FIG. 2 is a side view of the link of FIG. 1.

Referring to FIGS. 1 and 2, one example of a hydrogen fusible link 100 includes a body portion 102 that is preferably formed from a thermally conductive material, such as brass, aluminium, steel, other metals or any other suitably conductive material. Preferably, the thermal conductivity of the body is at least 10 watts per meter-kelvin (W/(m·K) and may be between 10 and about 400 (W/(m·K) or more. This may help facilitate the transfer of heat within the body portion 102, so that heat generated in the reaction region 106 (catalyst covered surfaces) can be conveyed to the bonding region 108 and bonding material 110. In some embodiments, body portion 102 can be made of a laminate of several materials, designed in such a way as to improve heat transfer generated at the surface on the catalyst material 116 to the bonding region 108.

In this example the body portion 102 has an outer surface 104 that defines a reaction region 106 and a bonding region 108. In this example the bonding region 108 is provided as a generally square/rectangular region that is provided toward one end of the body portion 102, and is provided on one side (the upper side as illustrated in FIGS. 1 and 2) of the body portion 102. In other examples, the bonding region may have different shapes and optionally may be provided on two or more different surfaces of the body portion.

The bonding region 108 is preferably configured to be connected to another object using a suitable bonding material 110 that can be used to attach the body portion 102 to an object and that can be weakened, for example by melting, when its temperature reaches a melting or activation temperature. Preferably, the melting temperature of the bonding material 110 is higher than the expected operating or ambient temperatures that the link 100 may be exposed to while in normal operation. For example, the operating temperatures may be between −20 degrees Celsius and 60 degrees Celsius, and may be between −10 and 50 degrees Celsius, between 0 and 40 degrees Celsius, and may be less than about 60, or 50, or 40, or 30, or 20 degrees Celsius. Preferably, the bonding material 110 may be selected so that its melting temperature is equal to or greater than the operating temperature, and preferably well above the expected maximum ambient operating temperature that is expected for a given embodiment (e.g. preferably greater than 10, 20, 30 or 40 degree Celsius above the maximum expected ambient/operating temperature). In some configurations the melting temperature may be greater than 60, 70, 80, 90, 100, 110, 120, 120, 130, 140, 150, 160, 170, 180, 190, or 200 or more degrees Celsius. Preferably, as described herein, the catalyst material chosen in a given example of the link, such as the links described herein, can be selected to that it will heat up to a temperature that is greater than the melting temperature of the chosen bonding material when exposed to concentrations of hydrogen that are below the flammability threshold, and preferably at hydrogen concentrations that are equal to or less than 4% vol., 3.5% vol., 3% vol., 2.5% vol., 2% vol., 1.5% vol. or 1% vol. For example, as shown in some of the tests described herein, a link can be configured so that its catalyst material will heat up to a bonding material melting temperature that is greater than 70 degrees when exposed to a hydrogen concentration that is equal to or less than 2% vol. (see Tables 2 and 3, for example) and optionally may heat up to a temperature that is greater than 80, 90, 100, 110, 120 or higher degrees Celsius when exposed to a hydrogen concentration that is equal to or less than 2% vol. The temperatures generated by a given link may be modified by changing the amount of catalyst material used, the material of the link members and other parameters described herein to provide a link with a desired combination of temperature generation and hydrogen sensitivity.

The bonding material may be any material with a heat-promoted release (melting or otherwise relaxing of the chemical bond) that can bond body portion 102 to another object, such as the schematic example of an object 112 shown in FIG. 2, and with the bond failing upon the bonding material being heated to an elevated activation temperature. When in its solid state, the bonding material may adhere the body portion 102 to the object 112. For example, the bonding material may include solder or brazing material, metals, or plastics that can be applied in a molten or liquid state and when cooled below a melting or setting temperature can help bond the body portion 102 to another object. In another example, the bonding material may be an adhesive that when dried, set or cured, can help bond the body portion 102 to another object.

Preferably, the link 100 may also include a mechanical attachment portion that can be configured to connect to other, complimentary objects or fasteners when the link 100 is in use. In this example, the link 100 includes a mechanical attachment portion in the form of a hook 114 that can be connected to other objects. In this arrangement, the link 100 may be used to secure two different objects together until a pre-determined activation condition is met, at which point the bonding material 110 may be weakened and the mechanical bond/linkage may disengage as the bonding material 110 may give way. The mechanical attachment portion may be thermally isolated from the body portion 102 to reduce heat loss to the mechanical attachment portion.

In addition to the bonding region 108, the link 100 includes a reaction region 106 that is intended to be coated with a suitable catalyst material 116. The catalyst material 116 can be applied/deposited using any suitable technique and is preferably selected so that it can help facilitate an exothermic chemical reaction when exposed to hydrogen in combination with oxygen and/or air. That is, the catalyst material 116 can be selected to facilitate an exothermic chemical reaction when exposed to gaseous oxygen and gaseous hydrogen which can produce heat. The catalyst material may be any suitable material that can be applied to the body portion 102 and that is stable in the expected operating conditions, and optionally may include noble metal or metals as the active ingredient and other catalyst materials. U.S. Pat. No. 5,157,005 describes a catalyst material that would be suitable for this application.

Preferably, the design of the HFL (which includes an appropriate selection of the size and catalyst material) will be such that it will activate when a concentration of hydrogen in the surrounding air/atmosphere reaches a pre-determined activation concentration that the heat produced by the resulting chemical reactions will provide enough thermal energy to help fail the bonding material. The activation concentration may be configured to be about 1%, about 2%, or about 3% volume or more of hydrogen in the surrounding air, and preferably is less than the flammability limit of hydrogen in the air/ambient environment.

For example, the heat that is produced by chemical reactions in the reaction portion 106 can be conducted via the body portion 102 so that the temperature of the bonding material 110 is above the failure temperature of the bonding material 110. In this configuration, the temperature at the bonding region 108 may increase above the failure temperature of the bonding material 110. This may cause at least some of the bonding material 110 to melt and/or to be sufficiently weakened that the bond between the link 100 and object 112 can break. This can then allow the link 100 to move away from the object 112, or vice versa and can be used to help provide a desired action, such as the opening or closing of a vent or damper, the release of a coolant or fire suppression agent, the activation or deactivation of an HVAC system and the like.

The total amount of thermal energy produced by the link 100 for a given concentration of gaseous hydrogen may be generally proportional to the size of the reaction region 106 and catalyst/active ingredient concentration. Likewise, the amount of heat lost to the air by convection from reaction region 106 is also proportional to the size of reaction region 106. Optionally, the reaction region 106 can have a larger surface area than the bonding portion 108, and may cover at least some, and optionally substantially all of the surfaces of the body portion 102 that are not within the bonding portion 108. It is expected that the optimal ratio of the size of the reaction region 106 to the bonding portion 108 may be dependent on several factors influencing heat loss or transfer—for example, the choice of the material(s) comprising the body portion 102, or the inclusion of an insulating layer at the attachment point 114. In one embodiment, the optimal ratio of the reaction region 106 to the bonding portion 108 was found to be 3:1 in order to facilitate the generation of a desired and suitable amount of heat/thermal energy at the desired hydrogen concentrations (e.g. at concentrations that are below the flammability limit).

In this configuration, the link 100 can be configured so that when the catalyst material 116 is exposed to a concentration of gaseous hydrogen that is at or above the activation concentration, the reaction region 106 produces sufficient heat to raise at least some of the bonding material 110 above its activation/melting temperature, thereby melting/failing at least some of the bonding material 110 and triggering/activating the link 100.

In this example, the link 100 can fail, e.g., the bonding material 110 can melt, when it is exposed to a concentration of gaseous hydrogen that is above the activation concentration threshold and therefore release the link 100, which can then allow a subsequent action to occur. This process does not require electricity or active control inputs and can allow passive response systems to be developed in which a mechanical action (in this case the release of a link) can occur in response to relatively elevated hydrogen concentrations.

Figure 3:
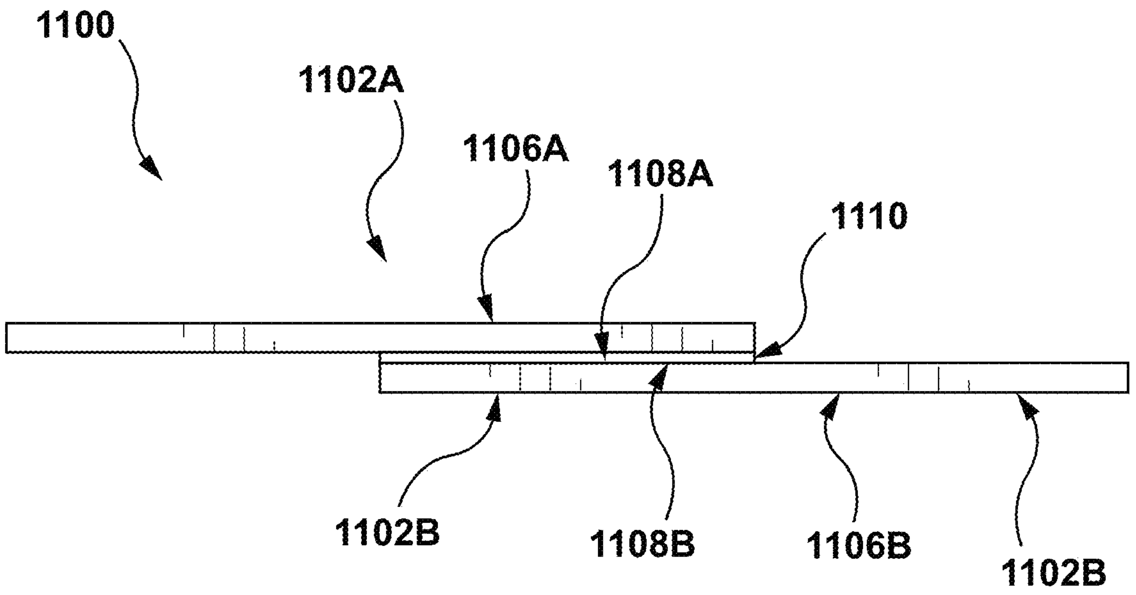
FIG. 3 is a is a side view of another example of a hydrogen fusible link.
Figure 4:
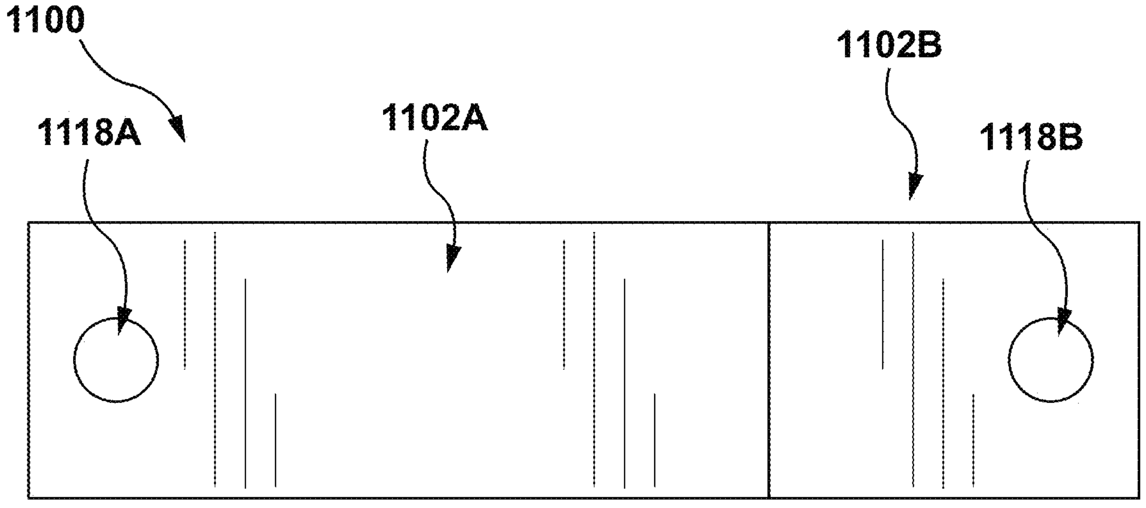
FIG. 4 is a perspective view of the link of FIG. 3.

Referring to FIGS. 3 and 4, another example of a fusible link 1100 includes a first body portion 1102A and a second body portion 1102B that can be bonded together using the bonding material 1110, rather than either body portion being directly bonded to a separate object, etc. The link 1100 is similar to link 100, and like features are annotated using analogous reference characters indexed by 1000.

In this example, the link 1100 can be a generally self-contained link and can have mechanical attachment portions, in the form of bolt holes 1118A and 1118B that can receive any suitable fasteners. This can allow the link 1100 to be connected to a surrounding object/structure using suitable fasteners. The fasteners may be thermally insulated from link 1100 to limit heat loss from link 1100 to the fasteners.

Each body portion 1102A and 1102B can, in this example have respective reaction portions 1106A and 1106B coated with suitable catalyst material, and respective bonding portions 1108A and 1108B that are configured to be complimentary and to be bonded to each other using the bonding material 1110. When the link 1100 is exposed to relatively elevated concentrations of gaseous hydrogen, the reactions in the reaction portions 1106A and 1106B can be sufficient to raise the temperature of the bonding material 110 above the activation/melting temperature of the bonding material 1110. This can cause the bonding material 1110 to fail, thereby severing the bond between the body portions 1102A and 1102B. Each body portion 1102A and 1102B can then be free to move away from each other, which may facilitate the activation or deactivation of an associated piece of equipment.

Figure 5:
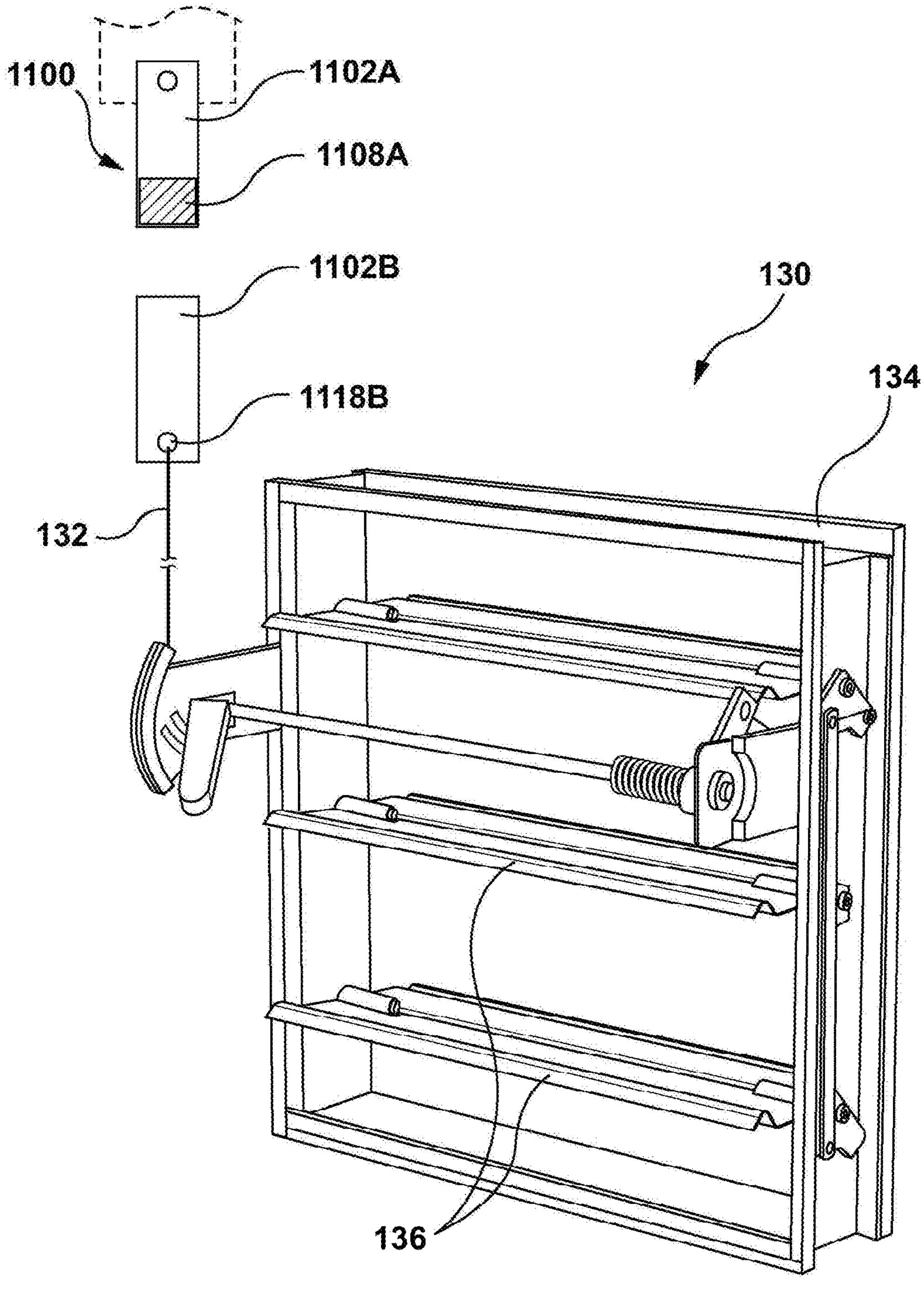
FIG. 5 is a schematic representation of a portion of one example of a passive, hydrogen-triggered ventilation system.

The links described herein, or analogous links may be used as part of a passive, hydrogen-triggered safety or ventilation system. Such a system may include a variety of components including, for example and referring to FIG. 5, a damper 130 having a frame 134 and blades 136 that are weighted to fail into the open position (as illustrated) and to be held in a closed position by a mechanical connection that includes a hydrogen fusible link 100 or 1100. For example, the link 1100 may be connected to the damper 130 via a wire 132 and to another object, such as a wall or sufficient strong piece of a surrounding structure. If the hydrogen concentration in the vicinity of the link 1100 reaches the activation concentration, the heat produced by the catalyst on the link 1100 may be sufficient to melt the bonding material 1110, thereby allowing the link 1100 to separate and for the blades 136 to fall into their open configuration to help promote air exchange and ventilate the surrounding area. Preferably, the links 1100 would be provided on the interior side of the damper 130 (e.g. within the region where hydrogen accumulation may be expected to occur) so that the links 1100 can be triggered as hydrogen accumulates. While shown in a generally vertical orientation, dampers 130 of this nature may be installed horizontally or in other suitable orientations while still being controllable/triggerable using a link 1100 or 100 (if bonded directly to the vanes rather than utilizing the wire 132).

Figure 6:
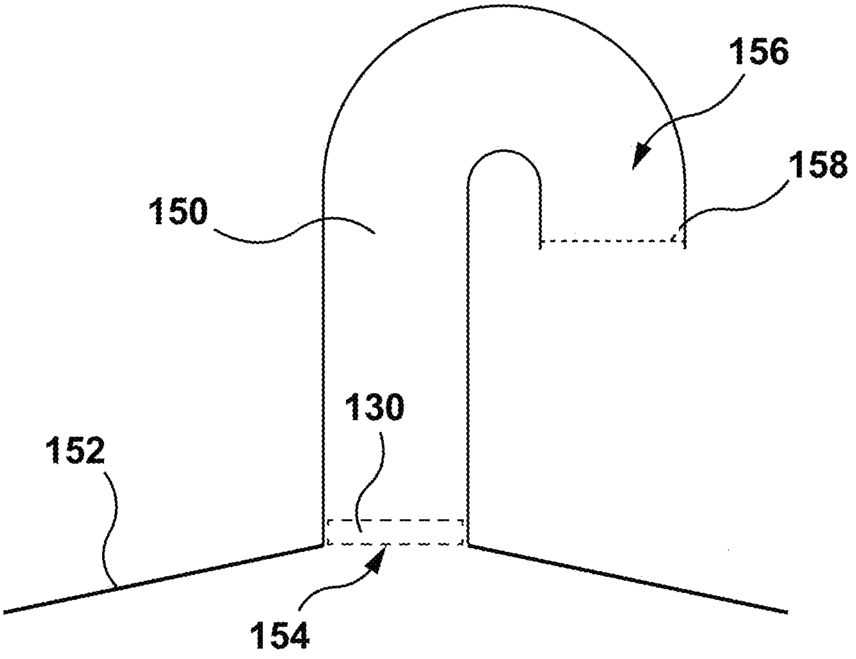
FIG. 6 is a schematic view of roof ventilation apparatus.
Figure 7:
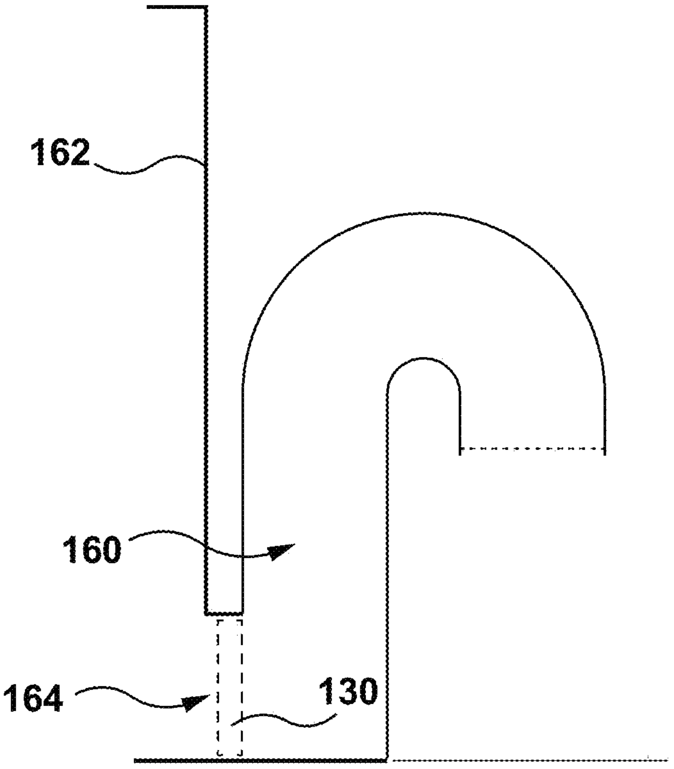
FIG. 7 is a schematic view of a wall ventilation apparatus.

Referring to FIGS. 6 and 7, example of structures or portions of structures into which dampers 130 may be installed are shown. In the FIG. 6, the structure includes a ventilation passage 150 that can be provided adjacent a roof 152 of a building and may have an inner end 154 and an outer end 156 that can optionally be covered with a suitable grate 158 to help prevent debris, animals and the like from entering the passage 150. FIG. 7 shows an analogous schematic of a passage 160 that is configured to be provided in the wall 162 of a structure and includes an inner end 164 and an outer end 166 that can be covered by a suitable grate 168 or other device.

Figure 8:
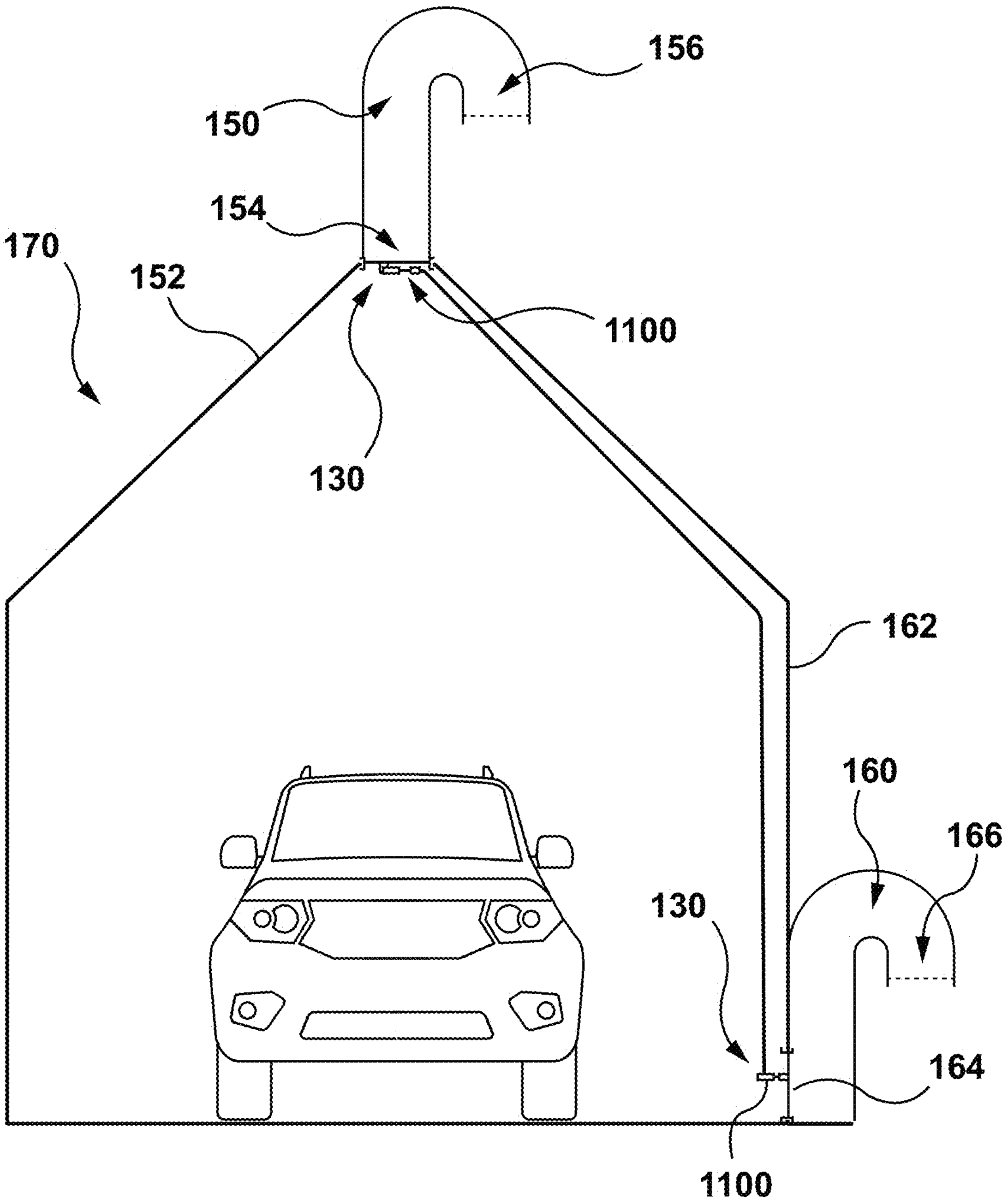
FIG. 8 is a schematic representation of a building that can incorporate a passive, hydrogen-triggered ventilation system.

Referring to FIG. 8, a schematic illustration of a structure 170 (a garage in this example) is shown having passages 150 and 160 provided in its roof 152 and sidewall 162 respectively. The inner ends 154 and 164 of each passage 150 and 160 include dampers 130 in which the blades are held in their closed positions using hydrogen fusible links 1100 when under normal operating conditions. With the blades closed, the dampers 130 can inhibit air flow through the passages 150 and 160 and the garage can remain generally isolated from the outside environment.

Figure 9:
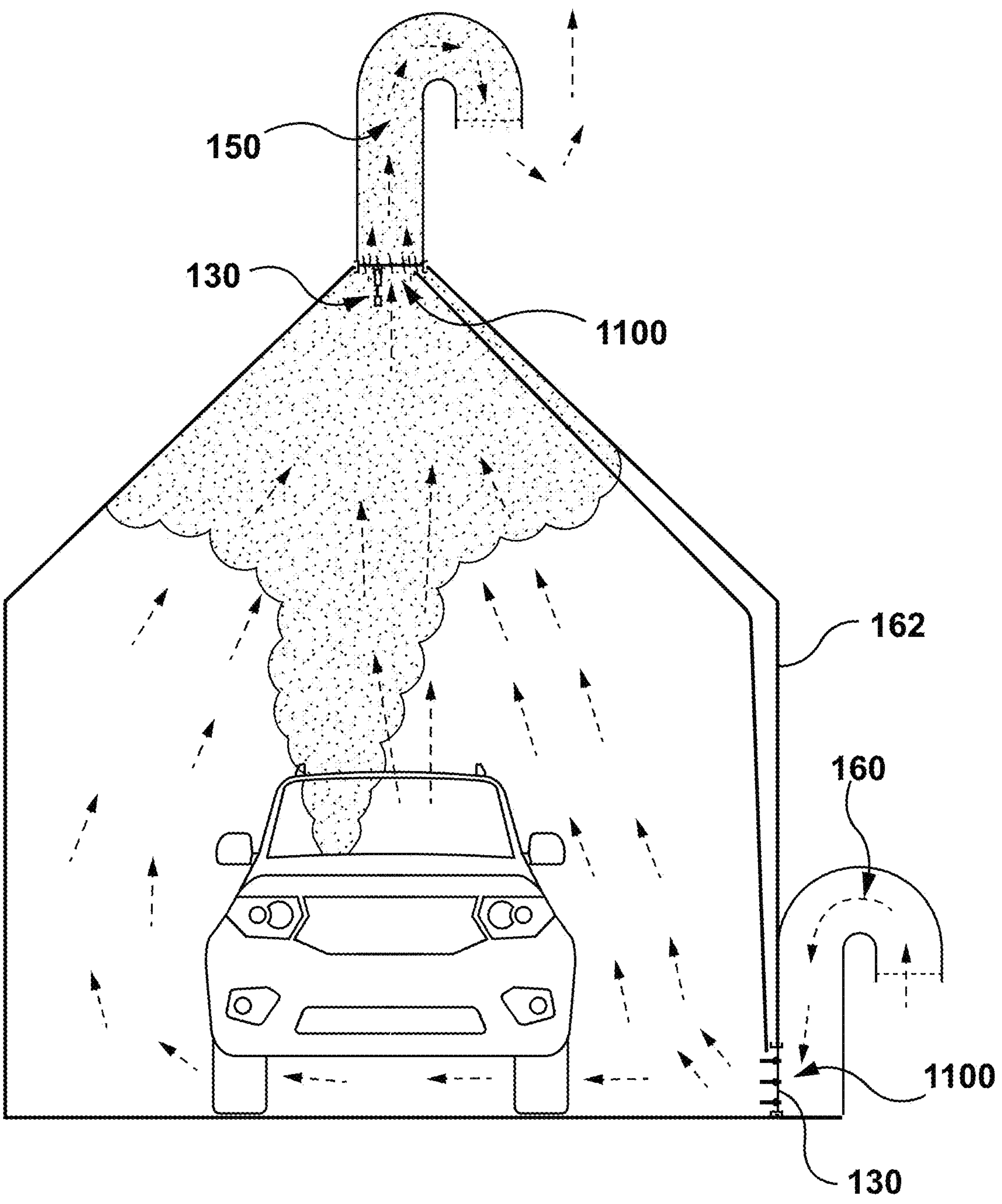
FIG. 9 is a schematic representation of a building that can incorporate a passive, hydrogen-triggered ventilation system, when a hydrogen concentration has reached an activation concentration.

Referring also to FIG. 9, if hydrogen gas were to escape from a vehicle within the garage 170 then the concentration of hydrogen in the air within the garage 170 may increase. As the hydrogen concentration rises, the links 1100 may facilitate chemical reactions and their temperature may increase until the bonding material reaches the activation temperature. At this temperature the bonding material in the links 1100 may fail, separating link 1100, thereby allowing the blades on the dampers 130 to fall into their open configurations (e.g. under the influence of gravity and/or because of a counterweight, biasing member or the like such as a spring). The opening of the dampers 130 in response to an accumulation of hydrogen may help ventilate the interior of the garage 170, thereby reducing the concentration of hydrogen within the garage 170 before it reaches the flammability limit. This may help prevent a fire or explosion within the garage 170. In this example, one damper 130 is provided toward the floor in the sidewall 162 and one is provided at a high-point in the roof 152. This may help facilitate a convective air flow within the garage 170 to help dissipate the accumulating hydrogen. In other examples, other configurations and placements of the dampers 130 and passages 150 and 160 can be utilized. Additional fans and similar devices may also be provided, but are not necessary in all embodiments.

Figure 10:
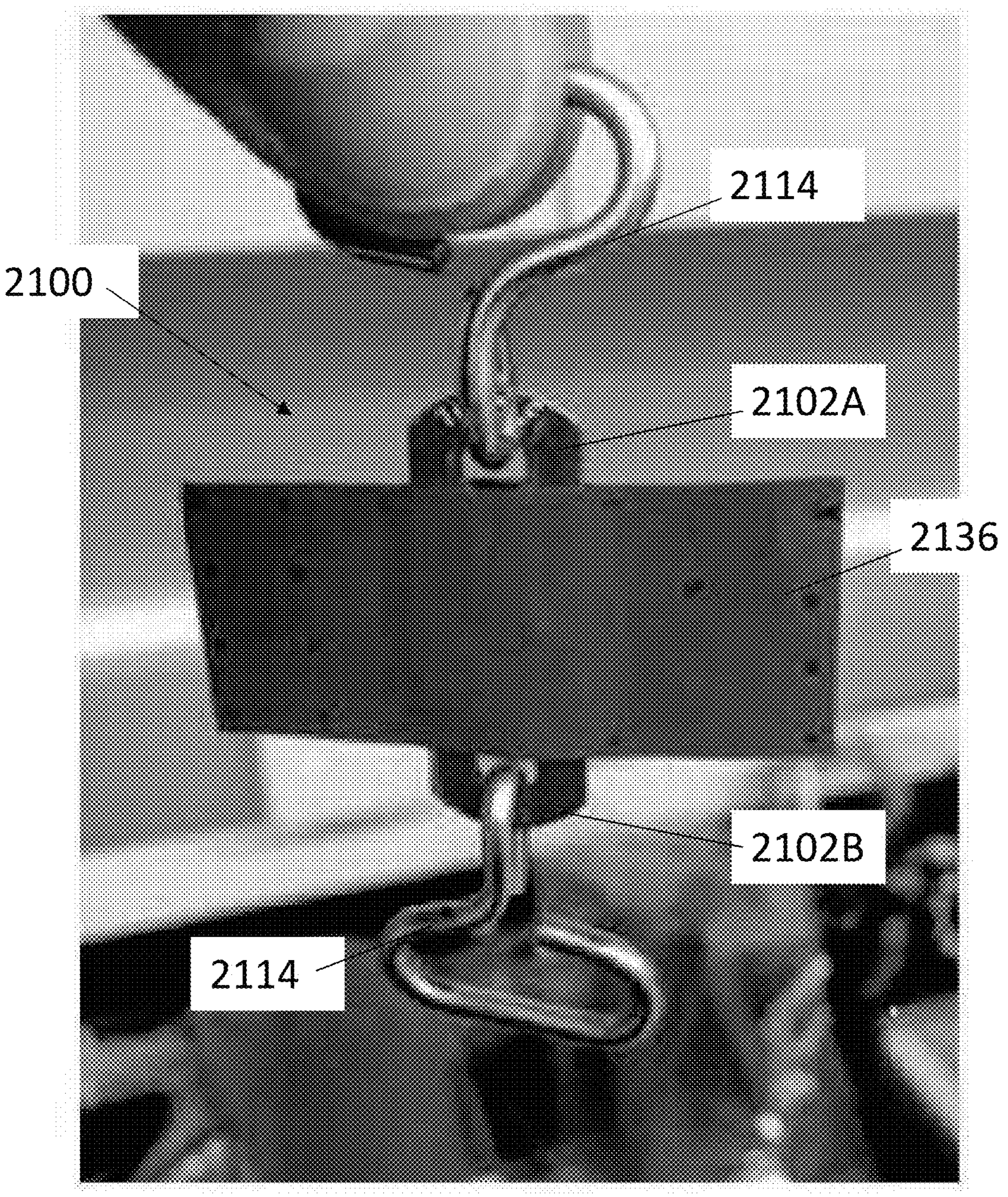
FIG. 10 is a photo of one example of a hydrogen fusible link for testing.
Figure 11:
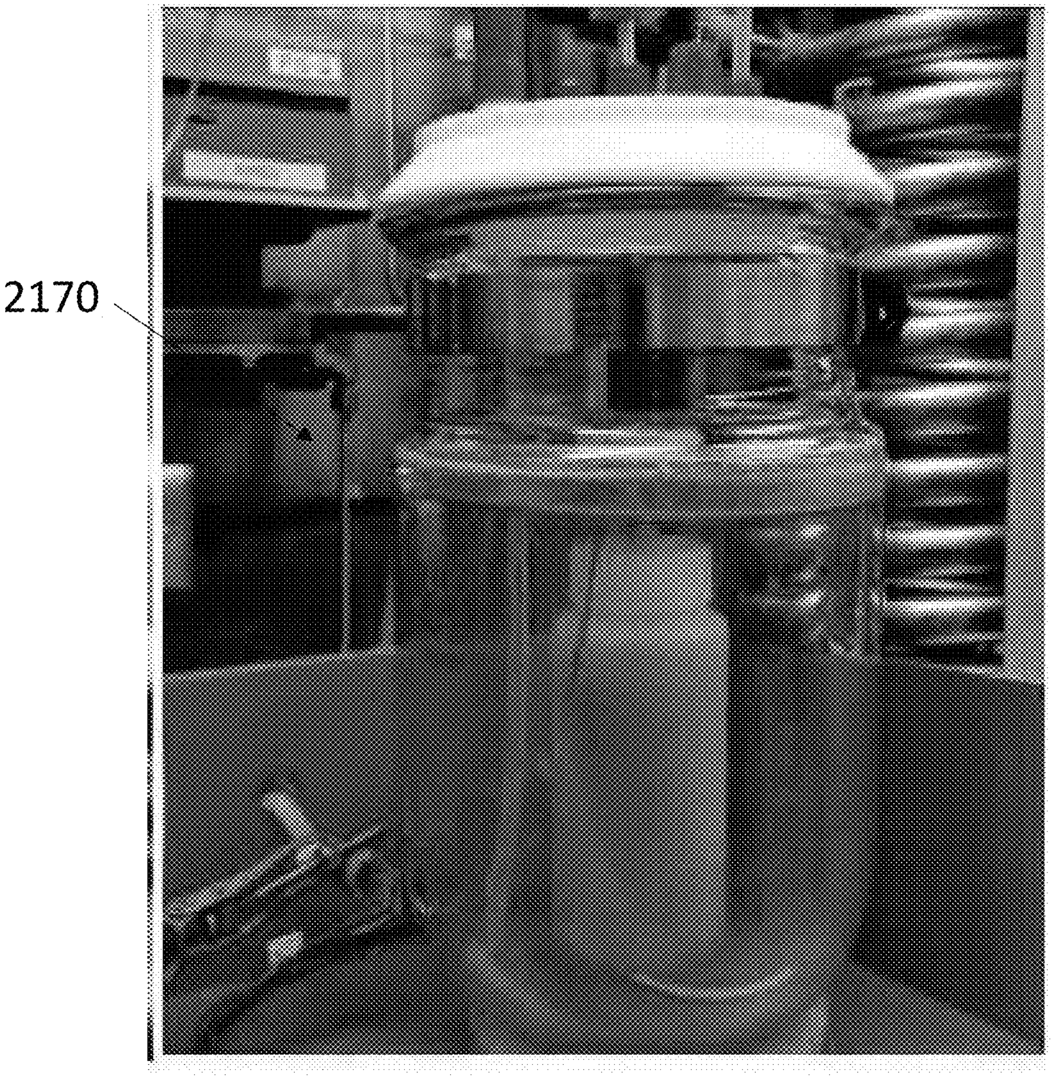
FIG. 11 is a photo of a test apparatus.

Examples of a hydrogen fusible link were tested, and one example of a test link 2100 is illustrated in FIG. 10. In this example, the body portions 2102*a* and 2102B were sandwiched between two pieces of the Type 99-11 catalyst formulation (developed by Atomic Energy of Canada Limited), which is bound to a stainless steel mesh 2136. The test link 2100 was then disposed within a test vessel 2170 (FIG. 11) in which the concentration of hydrogen could be varied. The link 2100 was then exposed to various concentrations of hydrogen to determine if the catalyst could generate sufficient heat to melt or otherwise weaken the bonding material used to bond the body portions 2102A and 2102B together. This tests showed that the AECL Type 99-11 catalyst formulation was able to generate sufficient heat to cause the link 2100 (rated at 74 and 100 degrees Celsius) to separate in the presence of a relatively low hydrogen/air mixture (between about 0.5% and about 3% hydrogen by volume).

Figure 12:
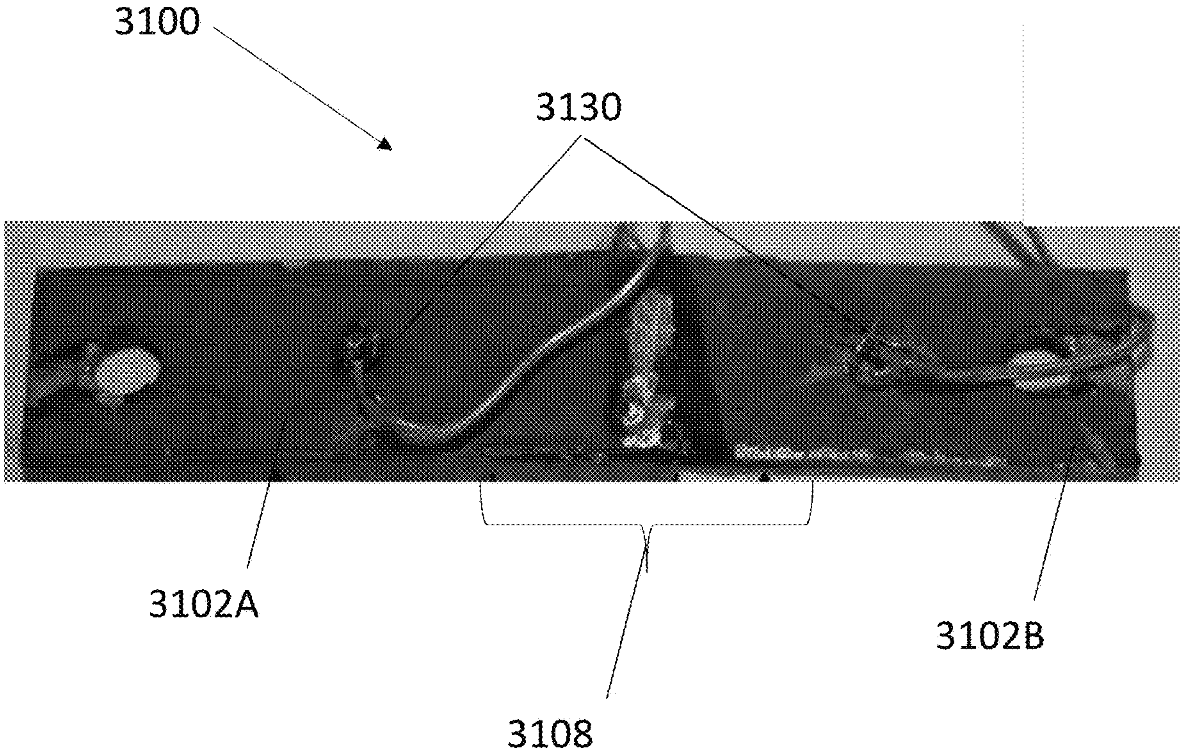
FIG. 12 is a photo of another example of a hydrogen fusible link for testing.

A second series of tests was performed with the catalyst material coated onto a test link 3100 that included two small rectangular brass plates (3.9×1.3×0.1 cm) providing the body portions 3120A and 3102B, as shown in FIG. 12. These brass plates were then soldered together to create prototypes of a hydrogen fusible link 3100 (see FIG. 12). Experiments have been performed to correlate solder temperatures (measured via thermocouples 3130) with hydrogen concentration. These experiments exposed the catalyst-coated links 3102A and 3102B to hydrogen concentrations ranging from about 0.5% to about 3.0% by volume. A high temperature solder was used for these experiments to ensure that the link did not separate during these tests and so that temperature readings could be obtained. In practice, a solder material with a lower melting temperature could be used to help facilitate link separation. These tests were performed with the links 3100 in the horizontal and vertical orientation. The peak temperatures at the solder (middle of the link) are shown in Table 1. In these tests, the horizontal orientation resulted in relatively higher maximum temperatures as compared to the vertical orientation of the link 3100. In the horizontal orientation, the solder reached 70° C. at 1 vol % hydrogen, and reached 190° C. at 3 vol % hydrogen. These temperatures are sufficiently high so as to be able to melt a solder with a lower melting temperature and to therefore cause the test link to separate below the lower flammability limit of about 4 vol % hydrogen within a given environment.

TABLE 1

Effect of orientation of the fusible link on its temperature

| $H_2$ concentration at the vessel inlet [(1)] (vol %) | Temperature of the fusible link (° C.) Horizontal Orientation | Vertical Orientation |
|---|---|---|
| 1.0 | 53 | 70 |
| 2.0 | 132 | 128 |
| 3.0 | 190 | 167 |

[(1)] The $H_2$ concentration at the fusible link was not measured, but it was lower than at the vessel inlet as per the measurements of the fourth series tests.

A third series of tests examined the effect of catalyst coated surface area and shape of fusible links on heat transfer behavior (see Table 2). These measurements showed that a smaller link surface area (1.3×2.3 cm 2) registered higher solder temperature at a given hydrogen concentration, potentially because of the reduced surface area for convective heat loss.

TABLE 2

Effect of fusible link surface area and shape on its temperature

| Fusible Link Shape | Width × Length (cm) | $H_2$ concentration at the vessel inlet [(1)] (vol %) | Temperature of the fusible link (° C.) |
|---|---|---|---|
| Rectangular | 1.3 × 3.9 | 1.0 | 64 |
| | | 1.5 | 102 |
| | | 2.0 | 129 |
| Triangular | [2.9, 1.3] × 2.8 | 1.0 | 57 |
| | | 1.5 | 108 |
| | | 2.0 | 142 |
| Rectangular | 1.3 × 2.3 | 1.0 | 68 |
| | | 1.5 | 124 |
| | | 2.0 | 158 |

[(1)] The $H_2$ concentration at the fusible link was not measured, but it was lower than at the vessel inlet as per the measurements for the fourth series tests (described below).

A fourth series of tests was performed to characterize the transient behavior of the fusible link temperature as a function of hydrogen concentration and its rate of increase (see the results shown in Table 3). These measurements demonstrated that the catalyst reaction started almost immediately when the link was exposed to hydrogen; there is a time delay in the link temperature increase, therefore the hydrogen concentration increase rate has to be below a limit to allow the link to the reach activation/melting temperature at the pre-determined hydrogen concentration. This time delay is dependent on the design HSL+ (geometry, body material, bonding material, and catalyst).

TABLE 3

Effect of $H_2$ concentration and rate of $H_2$ concentration increase on fusible link temperature

| Rate of $H_2$ increase (vol %/min) | $H_2$ concentration at the fusible link (vol %) | Temperature of the fusible link (° C.) |
|---|---|---|
| 0.25 | 1.2 | 74 |
| 0.38 | 1.2 | 93 |
| 0.5 | 1.2 | 133 |
| 1.0 | 1.6 | 161 |
| 1.3 | 1.7 | 170 |
| 1.5 | 1.7 | 178 |
| 2.0 | 2.0 | 193 |
| 2.5 | 2.0 | 198 |

A fifth series of tests was performed to further characterize the transient behavior of the fusible link temperature as a function of hydrogen concentration. Hydrogen concentration was examined in terms of its rate of accumulation at the link when pure hydrogen was released into a confined space with air under quiescent or fan-induced turbulent conditions, resulting in well-mixed or stratified hydrogen-air mixtures. A link with a surface area of 1.3×2.3 cm 2 was utilized during these tests. The measurements demonstrated that the link temperature exceeded 75° C. at less than 2 vol % hydrogen, with an accumulation rate up to 1 vol % hydrogen per minute under turbulent conditions (uniform mixtures). Under quiescent conditions (stratified mixtures), the link temperature exceeded 75° C. at less than 3.5 vol % hydrogen, with an accumulation rate up to 2 vol % hydrogen per minute.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

We claim:

1. A hydrogen fusible link comprising:

a) a first link member including a body comprising a thermally conductive material and having an outer surface, a first side of the outer surface having a bonding region and the first side and a second side of the outer surface having a reaction region;

b) a bonding material applied to the bonding region on the first side of the outer surface and configured to be in a solid state at an operating temperature to bond the first link member to another object positioned adjacent the bonding region, the bonding material having a melting temperature that is greater than the operating temperature; and c) a catalyst material coating the reaction region on the first side and the second side of the outer surface, the catalyst material configured to facilitate an exothermic chemical reaction when exposed to gaseous hydrogen to produce heat, wherein heat produced by the catalyst material is conducted to the bonding region via the body to heat up the bonding material;

and wherein the first link member is configured so that when the catalyst material is exposed to a concentration of gaseous hydrogen that is at or above an activation concentration the reaction region produces sufficient heat to raise at least some of the bonding material above the melting temperature thereby failing at least some of the bonding material.

2. The link of claim 1, wherein the activation concentration of hydrogen is less than about 4 percent hydrogen by volume.

3. The link of claim 1, wherein the activation concentration of hydrogen is less than about 2 percent hydrogen by volume.

4. The link of claim 1, wherein the body portion has a thermal conductivity of at least 10 watts per meter-kelvin (W/(m·K).

5. The link of claim 1, wherein the body portion has a thermal conductivity between 10 watts per meter-kelvin (W/(m·K) and about 400 (W/(m·K).

6. The link of claim 1, wherein the first link member comprises brass.

7. The link of claim 1, wherein the catalyst material comprises at least one of a platinum catalyst and a palladium catalyst.

8. The link of claim 1, wherein the first link member also includes a mechanical attachment portion for attaching to another structure.

9. The link of claim 1, further comprising a second link having a body comprising a thermally conductive material and defining an outer surface, the outer surface having a second reaction region and a second bonding region that is opposite and bonded to the bonding region of the first link member via the bonding material.

10. The link of claim 9, wherein the second link has a second mechanical attachment portion for attaching to another structure.

11. The link of claim 1, wherein the catalyst material comprises a Type 99-11 catalyst formulation material.

12. The link of claim 1, wherein the catalyst material is configured so that the reaction region produces sufficient heat to raise at least some of the bonding material to a temperature that is greater than 70 degrees Celsius, and preferably is greater than 80, 90, 100, 110, 120 higher degrees Celsius when exposed to a hydrogen concentration that is equal to or less than 2% hydrogen by volume.

13. A passive, hydrogen-triggered ventilation system comprising:

a) a damper comprising at least one blade that is moveable between an open position in which air can flow through the damper and a closed position in which airflow through the damper is inhibited, the at least one blade being biased toward the open position;

b) a hydrogen fusible link retaining the at least one blade in the closed position, the hydrogen fusible link comprising a first link member including a body comprising a thermally conductive material and having an outer surface, a first side of the outer surface having a bonding region and the first side and a second side of the outer surface having a region;

c) a bonding material applied to the bonding region on the first side of the outer surface and configured to be in a solid state at an operating temperature to connect the first link member to the at least one blade, the bonding material having a melting temperature that is greater than the operating temperature; and d) a catalyst material coating the reaction region on the first side and the second side of the outer surface, the catalyst material configured to facilitate an exothermal chemical reaction when exposed to gaseous oxygen and gaseous hydrogen to produce heat, wherein heat produced by the catalyst material is conducted to the bonding region via the body to heat up the bonding material;

and wherein first link member is configured so that when the catalyst material is exposed to a concentration of gaseous hydrogen that is at or above an activation concentration the reaction region produces sufficient heat to raise at least some of the bonding material above the melting temperature thereby melting at least some of the bonding material thereby disconnecting the first link member from the at least one blade and allowing the at least one blade to move toward the open position.

14. The system of claim 13, wherein the bonding region of the first link member is directly connected to the at least one blade.

15. The system of claim 14, further comprising a second link having a body comprising a thermally conductive material and defining an outer surface, the outer surface having a second reaction region and a second bonding region that is opposite and bonded to the bonding region of the first link member via the bonding material, and wherein the second link extends between and connects the first link member to the at least one blade.

16. The system of claim 13, wherein the activation concentration is less than about 4 percent hydrogen by volume.

17. The system of claim 13, wherein the body portion has a thermal conductivity of at least 10 watts per meter-kelvin (W/(m·K).

18. The system of any one of claim 13, wherein the first link member comprises brass.

19. The system of claim 13, wherein the catalyst material comprises at least one of a platinum catalyst and a palladium catalyst.

20. The system of claim 13, wherein the catalyst material comprises a Type 99-11 catalyst formulation material.

21. The system of claim 13, wherein the catalyst material is configured so that the reaction region produces sufficient heat to raise at least some of the bonding material to a temperature that is greater than 70 degrees Celsius, and preferably is greater than 80, 90, 100, 110, 120 higher degrees Celsius when exposed to a hydrogen concentration that is equal to or less than 2% hydrogen by volume.

* * * * *